United States Patent Office 3,124,517
Patented Mar. 10, 1964

3,124,517
NEW LYTIC ENZYME AND PREPARATION THEREOF
Philippe R. Eloy, Paris, France, assignor to Laboratoires Toraude, Paris, France, a French Company
No Drawing. Filed Sept. 15, 1958, Ser. No. 760,835
2 Claims. (Cl. 195—66)

The present invention relates to a new enzyme lytic against certain other species of bacteria and to a process for preparing the new enzyme.

The new enzyme of the invention is obtained from the spores of strains of Bacillus sp. (Schaeffer, Ann. Inst. Pasteur, 78:624 (1950)), which special strain has been deposited with the Pasteur Institute and classified as strain of *Bacillus cereus* No. 5832, where it is under permanent check. Specimen cultures have been deposited with American Type Culture Collection and have been given ATCC No. 14,893. It is the same special strain of Bacillus sp. which is used for the products Bactisubtil and Bactisubtil Sec of Laboratories Pharmaceutiques Toraude of Paris, France, and which products are described in Dictionnarie de Specialites Pharmaceutiques, Louis Vidal, 1956, pages 261–262, and are useful in gastro-enterology to combat acute and chronic intestinal infections and for the treatment of diarrhea, enteritis, colitis and related gastro-intestinal disturbances particularly in the presence of orally administered antibiotics such as the various known sulfa drugs to which the special strain is resistant and prevents or overcomes intolerances to such antibiotics.

The new enzyme, as produced by the procedure hereinafter described, is a yellowish white powder which is soluble in water and acid and insoluble in organic solvents; it is precipitated from its aqueous solutions by ammonium sulfate and has its optimum lytic activity at pH 8 as shown by its lowering of the optical density of a bacterial culture (a suspension of the acetone-dried vegetative cells of the same organism) treated with the enzyme, as compared with the same bacterial culture untreated and serving as a control, when said bacterial culture is formed from an organism selected from the group consisting of *Bacillus megatherium*, *Escherichia coli* and *Salmonella typhimurium* and is previously treated with chloroform, Versene (0.05 M), Polymixin (0.01%), sodium desoxycholate (1%) and acetone (followed by drying). The new enzyme is non-lytic toward *Staphylococcus aureus* and *Micrococcus lysodeikticus*. It likewise shows lytic action on Proteus sp. without preliminary treatment with any of the above mentioned substances. The new enzyme is thus distinguishable from any previously known lysozyme. The new enzyme gives the general reactions of proteins and its lytic activity is catalyzed by various metallic ions, particularly cobalt ions. Lysis takes place rapidly: for example, the enzyme from 2 mg. (dry weight) of spores produced a 43% drop in the optical density of chloroform-treated *S. typhimurium* in 15 minutes at 22° C.

The new enzyme is prepared, by way of example, by culturing *Bacillus cereus* No. 5832 under aeration for about 24 hours in a synthetic culture medium, centrifuging the culture medium, pulverizing the spores thus obtained, fractionating (by the method of Strange and Dark (J. Gen. Microbiol, 16:236 (1957)), a water suspension of the pulverized spores at pH 3, filtering the pH 3-soluble fraction, treating the filtrate with ammonium sulfate to form a precipitate of the crude enzyme and purifying the crude enzyme, as by dialysis. The aeration is carried out by passing sterile air through the synthetic medium at the rate of 50 liters of air per hour for each 7 liters of culture. The pulverizing of the spores takes place under agitation in the presence of glass beads at a temperature of 2° C. The synthetic culture medium has the following composition:

| | Grams |
|---|---|
| Monopotassium phosphate | 6.8 |
| Magnesium sulfate .7H$_2$O | 0.123 |
| Manganese sulfate .14H$_2$O | 0.00223 |
| Ferric sulfate | 0.02 |
| Zinc sulfate .7H$_2$O | 0.0144 |
| Yeast autolysate | 0.5 |
| Saccharose | 6.0 |
| Protein hydrolysate (Proteolysate Lefrancq) | 1.0 |
| Distilled water to make 1,000 milliliters. | |

The following results were obtained in tests against the below enumerated organisms all harvested in the exponential phase of growth and washed once:

TABLE I

*Lysis of Washed Cell Suspensions of Bacteria by Spore Enzyme at pH 8*

TREATMENT OF CELLS BEFORE TESTING

| Organism | None | Chloroform | Versene | Polymixin | Deoxycholate | Acetone Drying |
|---|---|---|---|---|---|---|
| B. Cereus | +− | | | | | ++ |
| B. megatherium | − | + | +− | +− | | ++ |
| E. coli (B) | − | ++ | +− | +− | ++ | ++ |
| Salmonella typhimurium | − | ++ | +− | + | +− | ++ |
| Staph. aureus | − | − | | | − | − |
| Micrococcus lysodeikticus | − | − | − | | | − |

(−) No lysis at 37°.
(+−) Slight lysis at 37°; none at 23°.
(+) Lysis at 23°.
(++) Rapid lysis at 23°.

Tests were also conducted to determine the action of the enzyme against live Enterobacteria. The conditions of the intenstines were simulated by using a salts growth medium, buffered at pH 8, containing 0.04% of desoxycholate and taurocholate and either trypsin or an extract of crude pancreatin. Spores incubated at 37° C. for 48 hours effected lysis and released their enzyme since the total viable count at the end of the tests was 1000 times lower than in the parallel control test without the bile salts or trypsin while the enzyme content of the medium was 10 times higher.

TABLE II

*Effect of Shaking Spore Suspension of B. cereus No. 5832 With Media Containing Enterobacteria To Be Lyzed*

| Additions to Medium | Final Bacterial Count per ml. suspension | Lytic Enzyme activity of 1 ml. of Supernatant Solution (Percent Lysis in 25 min.) |
|---|---|---|
| None | 3×10$^6$ | 8 |
| Bile salts + trypsin | 7×10$^3$ | 40 |
| Glucose (0.25%) | 8×10$^6$ | 10 |
| Glucose + bile salts and trypsin | 2×10$^2$ | 45 |

The new enzyme is thus useful for the lysis or dissolution of certain gram-positive and gram-negative bacteria and for the treatment of pathologic conditions arising from or caused by those bacteria and for its antagonism to the antigens of the foreign molecules created or released by such bacteria.

*Bacillus cereus* No. 5832, referred to above, has the following principal characteristics.

Morphology: Small mobile rods—density 0.9 gram positive. Voluminous and numerous lipidic vacuoles. Ovoidal spores, central or paracentral, thin-walled, not deforming the bacillus.
Metabolism: Aerobic-anaerobic optional.
Colonies: Large, dense, rugose, irregular border.
Broth: Turbidity uniform, abundant, and sediment.
Potato: Abundant dense dry culture.
Fermentations: On gelled medium with ammoniacal nitrogen and extract of yeast—
    Glucose: positive (without gas).
    Arabinose, xylose and mannitol: negative.
Citrate (Simmons): Negative.
Acetylmethylcarbinol: Positive.
Indole: Negative.
Nitrites: Positive.
Gelatine: Hydrolyzed.
Casein: Hydrolyzed.
Starch: Hydrolyzed.
Lecithinase: Positive.

What is claimed is:

1. A process for preparing a lytic enzyme from spores of *Bacillus cereus* No. 5832, comprising culturing *Bacillus cereus* No. 5832 under aerated conditions for a period of about 24 hours in the synthetic culture medium having the composition:

| | Grams |
|---|---|
| Monopotassium phosphate | 6.8 |
| Magnesium sulfate .7H$_2$O | 0.123 |
| Manganese sulfate .14H$_2$O | 0.00223 |
| Ferric sulfate | 0.02 |
| Zinc sulfate .7H$_2$O | 0.0144 |
| Yeast autolysate | 0.5 |
| Saccharose | 6.0 |
| Protein hydrolysate | 1.0 |

Distilled water to make 1,000 milliliters.

centrifuging the culture medium, pulverizing the spores thus obtained, fractionating a water suspension of the pulverized spores at pH 3, filtering the pH 3-soluble fraction, treating the filtrate with ammonium sulfate to form a precipitate of the crude enzyme and purifying the crude enzyme by dialysis.

2. The process of claim 1, in which aeration is carried out at the rate of 50 liters of sterile air per hour for each 7 liters of culture.

References Cited in the file of this patent

Biochemical Journal, vol. 62, pp. 387–401 (1956).
Journal of General Microbiology, vol. 16, pp. 1–8 and 236–248, 1957, Cambridge at The University Press, London.